United States Patent [19]

McElwain

[11] 4,067,626
[45] Jan. 10, 1978

[54] UNIVERSAL BEARING JOINT

[75] Inventor: John Christee McElwain, Rochester, Mich.

[73] Assignee: Rockwell International Corporation, Pittsburgh, Pa.

[21] Appl. No.: 715,771

[22] Filed: Aug. 19, 1976

[51] Int. Cl.² ............................................. F16C 11/02
[52] U.S. Cl. .............................. 308/207 R; 64/17 A; 308/216
[58] Field of Search .................... 308/207 R, 190, 193, 308/62, 212, 214, 207 A, 189 A; 64/17 A, 23

[56] References Cited

U.S. PATENT DOCUMENTS

| 2,983,029 | 5/1961 | Perin et al. | 308/212 |
| 3,660,989 | 5/1972 | Pitner | 308/207 R |

Primary Examiner—Richard A. Bertsch

[57] ABSTRACT

A bearing for receiving a journal comprises a bearing cup and a series of needle bearing elements interposed between the inner surface of the cup and the journal. Means are provided to bias the needle bearing elements into intimate rolling bearing contact with the outer bearing surface of the journal and bearing cup.

5 Claims, 4 Drawing Figures

UNIVERSAL BEARING JOINT

BACKGROUND OF THE INVENTION

1. Field of the Invention

This invention relates to universal joint assemblies of the yoke and cross type and, more particularly, to the trunion bearing mounting arrangement which tends to dissipate the operational loads over a number of needle bearing elements.

2. Description of the Prior Art

A typical prior art universal joint assembly includes a cross operationally connected to two yokes; there being needle bearing elements interposed between the trunions of the cross and the bearing cup associated with the yoke. The point of operational loading of this arrangement is such that the single needle bearing element located at that point assumes substantially the entire load. Obviously, the load is generally equally divided amongst each of the four trunnion - needle bearing - bearing cup arrangement. Accordingly, as each needle bearing element or roller traverses the cylindrical bearing cavity, it is in its unloaded state until it reaches the loading point and at that time becomes generally the only needle bearing element supporting the operational load. This inefficient use of the various needle bearing elements may result in galling of the bearing surfaces on each of the trunnions and/or the inner bearing surface of the bearing cups and similarly a galling or deterioration of the needle bearing elements.

SUMMARY OF THE INVENTION

Accordingly, it is an important object of the present invention to dissipate the load experienced at each of the trunnion - needle bearing - bearing cup arrangement amongst a number of needle bearing elements thereby improving the bearing characteristics of the universal joint and the prolongation of its operational life.

It is another object of the present invention to provide a bearing cup and a series of needle bearing elements interposed between the inner surface of the cup and the journal with means provided to bias the needle bearing elements into intimate roller bearing contact with the outer bearing surface of the journal and the bearing cup.

It is still another object of this invention to provide a bearing wherein the journal is a trunion formed on the ends of each of four equi-angularly spaced arms of a cross in a cross and yoke type universal coupling with a bearing cup mounted on each of the trunnions.

It is a further object of this invention to provide a bearing wherein the means to bias the needle bearing elements into intimate rolling contact with the outer bearing surface of the trunions and the inner bearing surface of the bearing cup is an inner bearing surface being formed slightly elliptical with respect to the cylindrical outer surface of the trunions.

It is a still further object of this invention to provide a bearing wherein the lesser diameter of the elliptical surface is generally disposed 90° from the maximum loading point occurring when the universal coupling is operationally transmitting a load and the major diameter of the elliptical surface occurring generally coincident with the maximum loading point.

It is another object of this invention to provide a bearing wherein the means to bias the needle bearing elements into intimate rolling contact with the outer bearing surface of the trunnion and the inner bearing surface of the bearing cup is the outer bearing surface which is formed slightly elliptical with respect to the cylindrical inner surface of the trunions.

It is a still further object of this invention to provide a bearing wherein the lesser diameter of the elliptical surface is generally disposed 90° from the maximum loading point occurring when the universal coupling is operationally transmitting a load and the major diameter of the elliptical surface occurring generally coincident with the maximum loading point.

It is another object of this invention to provide a bearing wherein the means to bias the needle bearing elements into intimate rolling contact with the outer bearing surface of the trunion and the inner bearing surface of the bearing cup is an insert member within the bearing cup. The insert member having an outer cylindrical surface in contact with the complementary inner cylindrical surface of the bearing cup. The inner surface of the insert member is slightly elliptical with respect to the cylindrical outer surface of the trunnions. The needle bearing elements are interposed in a bearing relationship between the cylindrical outer surface of the trunnions and the inner elliptical surface of the insert member.

It is a still further object of this invention to provide a bearing wherein the means to bias the needle bearing elements into intimate rolling contact with the outer bearing surface of the trunnion and the inner bearing surface of the bearing cup is an insert member mounted on each of the trunnions. The insert member has an inner cylindrical surface of the trunnions in contact with the complementary outer surface of the trunnions. The outer surface of the insert member is slightly elliptical with respect to the cylindrical inner surface of the bearing cup. The needle bearing elements are interposed in a bearing relationship between the cylindrical inner surface of the bearing cup and the outer elliptical surface of the insert member.

It is a further object of this invention to provide a bearing wherein the slightly elliptical inner and outer bearing surfaces of the insert member are coated with a self-lubricating plastic material.

Other objects of the present invention and details of the structure of the universal bearing joint will appear more fully from the following description and accompanying drawings.

DESCRIPTION OF THE PREFERRED EMBODIMENTS

Figure 1:
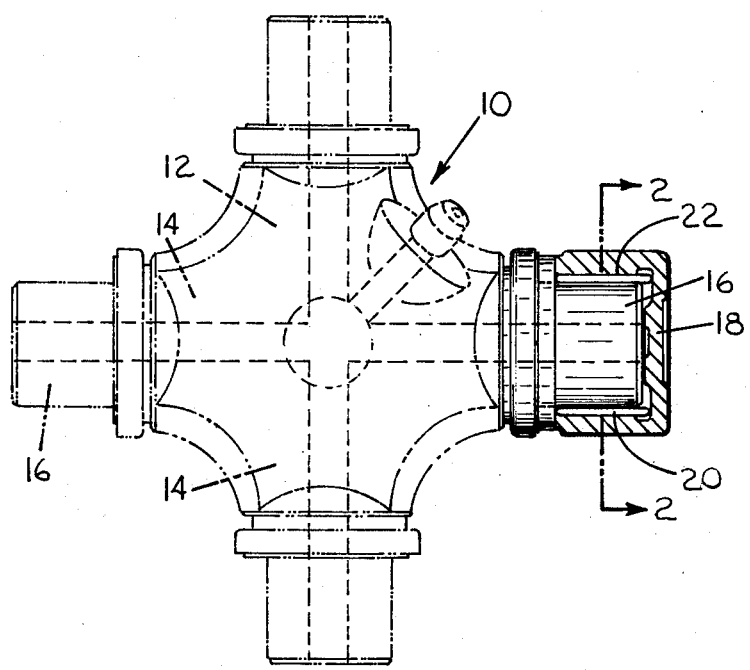
FIG. 1 is the universal bearing joint of the present invention.
Figure 2:
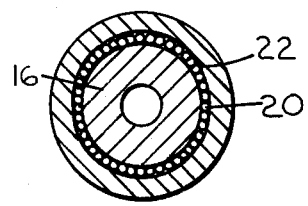
FIG. 2 is an end sectional view of the trunnion - needle bearing - bearing cup arrangement taken along the line 2—2 of FIG. 1.

Referring to the drawings and particularly FIGS. 1 and 2, there is shown a universal joint 10 which is adapted to transmit motion in a suitable power train. In view of the fact that couplings of this general type are well known in the prior art, it is believed unnecessary to set forth a detailed description of their construction other than that they include a cross or spider 12 having two pair of axially aligned, equi-axially spaced arms 14 that are each provided with trunnions 16. The trunions 16 are each adapted to be received in a bearing cup 18 and such bearing cups 18 are adapted to be mounted or attached to the arms of a driving or driven yoke (not shown).

It is at the trunion end of the universal joint 10 that the thrust of the present invention is to be found. More particularly, the present invention is directed to the relationship of the trunnion surface 16 which, in effect, is a bearing surface and the plurality of needle bearings 20 which are in bearing relationship between the trunion 16 and the inner bearing surface 22 of the bearing cup 18. The major objective and thrust of the present invention, as before mentioned, is to provide a universal joint 10 in which the force transmitted through the universal joint and particularly that force experienced by and between the needle bearings is experienced not by a single or few needle bearings but is dissipated over a number of needle bearings 20.

This basic objective of the present invention is to provide means to bias the needle bearing elements 20 into intimate rolling contact with the trunion 16 and the inner bearing surfaces 22 of the bearing cup 18. This can be achieved by forming the inner bearing surface 22 of the bearing cup 18 in a slightly elliptical manner and, more particularly, to form the inner bearing surface 22 of the bearing cup 18 in an ellipse wherein the lesser diameter of the elliptical surface is generally disposed 90° from the maximum loading point occurring when the universal joint 10 is operationally transmitting a load from the driving yoke to the driven yoke and the major diameter of the elliptical surface being formed such that it coincides with the maximum loading point. This elliptical surface 22, in effect, brings a plurality of needle bearings into intimate contact with their respective bearing surfaces including the trunnions 16 thereby ensuring that the operational load will be seen by at least several of such needle bearings. This is to be contrasted with the prior art forms of universal joints wherein only generally two needle bearings of each trunion cup arrangement see and experience the operational load at one time.

The needle bearings 20 can be brought into intimate contact with their respective bearing surfaces in a number of ways which will be further explained below. These additional modes of load dissipation are generally shown in FIGS. 3 and 4.

Figure 3:
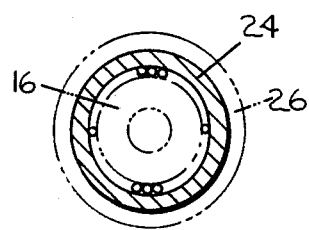
FIG. 3 is an end sectional view of a universal joint including another embodiment of the present invention.

Referring now to FIG. 3, there is shown a partial sectional view of another embodiment of the present invention wherein the bearing cup 24 is provided wtih an insert member 26. The insert member 26 may be pressfitted within the bearing cup 24 and fixedly attached thereto. The inner surface of the insert member 26 may be formed slightly elliptical in a fashion similar to the slightly elliptical inner bearing surface of the bearing cup 18. This is to say the insert member 26 provides at its inner surface a slightly elliptical surface against which the needle bearings bear.

Figure 4:
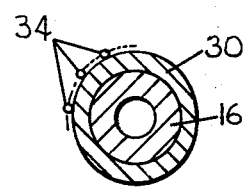
FIG. 4 is an end sectional view of a universal joint including yet another embodiment of the present invention.

Referring now to FIG. 4, there is shown a sectional view of yet another embodiment of the present invention wherein a collar or sleeve type insert member 30 is pressed on each trunion in an interference fit relationship. The outer surface of the insert member 30 may be formed in a slightly elliptical fashion comparable to those mentioned above. That is to say that the insert member 30 provides at its outer surface the slightly elliptical surface against which the needle bearings 34 bear.

It should be noted that to enhance the lubricity and bearing characteristics of the above-referenced universal bearing joint configurations various bearing surfaces may be coated with a suitable self-lubricating material as polytetrafluroethylene. It should be noted that the above-noted insert members 26 and 30 could be particularly useful in retro-fitting existing universal joints which are provided with complementary cylindrical trunions and inner bearing surfaces provided on the bearing cups.

It can be seen, therefore, from the above that the thrust of the present invention is to bring a plurality of needle bearings into intimate contact with their respective bearing surfaces particularly when they are subjected to an operational load. This approach avoids exposing the needle bearings independently to a full load situation as they revolve around the trunnions. This invention, therefore, includes forming the various bearing surfaces such that the needle bearings traverse a slightly elliptical path and, additionally, it should be noted that the needle bearings may be biased or preloaded against the bearing surfaces.

It is, therefore, obvious that the present invention is not to be limited to the specific details of the universal bearing joint above described; but is capable of other modifications and changes without departing from the spirit and scope of the appended claims.

I claim:

1. A bearing for receiving a journal comprising: a bearing cup, a series of needle bearing elements interposed between the inner surface of said cup and said journal, means to form a slightly elliptical path for said needle bearing elements as they revolve around said journal thereby bringing said needle bearing elements into intimate rolling bearing contact with the outer bearing surface of said journal and the inner bearing surface of said cup, said journal is a trunnion formed on the ends of each of four equiangularly spaced arms of a cross in a cross and yoke type universal coupling, a bearing cup being mounted on each of said trunnions, said means to bias said needle bearing elements into intimate rolling contact with the outer bearing surface of said trunion and said inner bearing surface of said bearing cup is an insert member inserted within said bearing cup, said insert member having an outer cylindrical surface in contact with the complementary inner cylindrical surface of said bearing cup, the inner surface of said insert member being slightly elliptical with respect to the cylindrical outer surface of said trunnions, said needle bearing elements interposed in a bearing relationship between the cylindrical outer surface of said trunnions and the inner elliptical surface of said insert member.

2. The bearing of claim 1 wherein said slightly elliptical inner bearing surface of said insert member is coated with a self-lubricating plastic material.

3. A bearing for receiving a journal comprising: a bearing cup, a series of needle bearing elements interposed between the inner surface of said cup and said journal, means to form a slightly elliptical path for said needle bearing elements as they revolve around said journal thereby bringing said needle bearing elements into intimate rolling bearing contact with the outer bearing surface of said journal and the inner bearing surface of said cup, said journal is a trunnion formed on the ends of each of four equi-angularly spaced arms of a cross in a cross and yoke type universal coupling, a bearing cup being mounted on each of said trunions, said means to bias said needle bearing elements into intimate rolling contact with the outer bearing surface of said trunnion and said inner bearing surface of said bearing cup is an insert member mounted on each of said trunions, said insert member mounted on each of said trunnions, said insert member having an inner cylindrical surface of said trunnions in contact with the complementary outer surface of said trunions, the outer surface of said insert member being slightly elliptical with respect to the cylindrical inner surface of said bearing cup, said needle bearing elements interposed in a bearing relationship between the cylindrical inner surface of said bearing cup and the outer elliptical surface of said insert member.

4. The bearing of claim 3 wherein said slightly elliptical outer bearing surface of said insert member is coated wtih a self-lubricating plastic material.

5. The bearing of claim 4 wherein means are provided to exert a preloading force on said needle bearing elements.

* * * * *